US012646833B2

(12) United States Patent
Luther et al.

(10) Patent No.: US 12,646,833 B2
(45) Date of Patent: Jun. 2, 2026

(54) PHASED ARRAY ANTENNA WITH RECONFIGURABLE TIME DELAY UNITS HAVING EXTERNAL BYPASS CONNECTIONS AND ASSOCIATED METHODS

(71) Applicant: EAGLE TECHNOLOGY, LLC, Melbourne, FL (US)

(72) Inventors: Justin Jody Luther, Melbourne, FL (US); Daniel A. Ramirez, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 204 days.

(21) Appl. No.: 18/497,445

(22) Filed: Oct. 30, 2023

(65) Prior Publication Data

US 2025/0141101 A1 May 1, 2025

(51) Int. Cl.
*H01Q 3/26* (2006.01)
*H01Q 3/24* (2006.01)

(52) U.S. Cl.
CPC ............. *H01Q 3/2682* (2013.01); *H01Q 3/24* (2013.01)

(58) Field of Classification Search
CPC ..... H01Q 3/2682; H01Q 3/24; H01Q 21/0006
See application file for complete search history.

(56) References Cited

U.S. PATENT DOCUMENTS

| | | | | |
|---|---|---|---|---|
| 6,124,827 A * | 9/2000 | Green | H01Q 3/2682 | 342/372 |
| 7,209,079 B2 * | 4/2007 | Easton | H01Q 3/2676 | 342/375 |
| 7,724,994 B1 * | 5/2010 | Pepper | H01Q 3/2676 | 385/27 |
| 2004/0051599 A1 * | 3/2004 | Marion | H01Q 21/0025 | 333/164 |
| 2006/0038599 A1 * | 2/2006 | Avants | H03H 11/265 | 327/276 |

(Continued)

FOREIGN PATENT DOCUMENTS

| | | |
|---|---|---|
| CN | 108227079 A | 6/2018 |
| CN | 113098464 | 11/2021 |

(Continued)

OTHER PUBLICATIONS

Cadence System Analysis "True Time Delay in Phased Array Antennas" https://resources.system-analysis.cadence.com/blog/msa2021-cadence-analysis-true-time-delay pp. 3.

(Continued)

*Primary Examiner* — Seokjin Kim
(74) *Attorney, Agent, or Firm* — ALLEN, DYER, DOPPELT, + GILCHRIST, P.A. Attorneys at Law

(57) ABSTRACT

A phased array antenna may include an antenna substrate, an array of antenna elements carried by the antenna substrate, and time delay units (TDUs) coupled to the array of antenna element. Each time delay unit may include a circuit substrate, and delay circuits carried by the circuit substrate and coupled in series. Each delay circuit may have a respective signal delay value. At least one external bypass connection is carried by the circuit substrate and is coupled to the delay circuits to configure an overall time delay of the time delay unit.

19 Claims, 13 Drawing Sheets

(56) References Cited

U.S. PATENT DOCUMENTS

| | | | | |
|---|---|---|---|---|
| 2009/0273533 | A1* | 11/2009 | Wolf | H01Q 3/2682 343/770 |
| 2017/0310295 | A1* | 10/2017 | Hahn | H03H 7/0115 |
| 2018/0131102 | A1* | 5/2018 | Wang | H01Q 3/38 |
| 2018/0219286 | A1* | 8/2018 | Lee | H01Q 3/2682 |
| 2019/0115658 | A1* | 4/2019 | Lannotti | H01P 1/184 |
| 2025/0141100 | A1* | 5/2025 | Ramirez | H01Q 3/2682 |

FOREIGN PATENT DOCUMENTS

| | | | | |
|---|---|---|---|---|
| CN | 116454621 | A * | 7/2023 | H04B 1/16 |
| EP | 4148899 | | 3/2023 | |
| KR | 20200072955 | A * | 6/2020 | H04B 17/364 |

OTHER PUBLICATIONS

Chen et al. "Reconfigurable True-Time Delay for Wideband Phased-Array Antennas" Proceedings of SPIE—The International Society for Optical Engineering • Jun. 2004; pp. 7.

U.S. Appl. No. 18/497,410, filed Oct. 30, 2023 Ramirez et al.

* cited by examiner

PHASED ARRAY ANTENNA WITH RECONFIGURABLE TIME DELAY UNITS HAVING EXTERNAL BYPASS CONNECTIONS AND ASSOCIATED METHODS

TECHNICAL FIELD

The present disclosure relates to antennas, and, more particularly, to a phased array antenna with reconfigurable time delay units having external bypass connections and associated methods.

BACKGROUND

Phased array antennas include an array of antenna elements that may be controlled to create a beam of radio waves that can be electronically steered to point in different directions without moving the antennas elements. The array of antenna elements are fed with a radio frequency (RF) input signal having a proper phase relationship so that the radio waves from the separate antenna elements combine to form beams, to increase power radiated in desired directions and suppress radiation in undesired directions.

Time delay units (TDUs) are typically used in a phased array antenna to provide the beam steering and phase shifting. The time delay units may be switched delay lines with quantized delays, for example. When placed in the signal paths on the array of antenna elements, these time delay lines introduce specific time delays.

Time delay units are generally designed on a case-by-case basis. Time delay units may be formed using gallium arsenide (GaAs) Monolithic Microwave IC (MMIC) technology, for example, which is expensive and has long lead times. A phased array antenna may have multiple time delay level requirements supporting the phased array architecture. This leads to multiple time delay unit designs. There is a need for time delay units to support the different time delay level requirements in phased array antennas.

SUMMARY

A phased array antenna may include an antenna substrate, an array of antenna elements carried by the antenna substrate, and a plurality of time delay units (TDUs) coupled to the array of antenna element. Each time delay unit may include a circuit substrate, and a plurality of delay circuits carried by the circuit substrate and coupled in series. Each delay circuit may have a respective signal delay value. At least one external bypass connection is carried by the circuit substrate and is coupled to the plurality of delay circuits to configure an overall time delay of the time delay unit.

The plurality of delay circuits may include at least one first delay circuit, at least one third delay circuit, and at least one second delay circuit between the at least one first delay circuit and the at least one third delay circuit.

The at least one external bypass connection may include a first external bypass connection coupled to an output of the at least one first delay circuit, a second external bypass connection coupled to an input of the at least one second delay circuit, a third external bypass connection coupled to an output of the at least one second delay circuit, and a fourth external bypass connection coupled to an input of the at least one third delay circuit.

The phased array antenna may further include a first external jumper coupled to the first and second external bypass connections to define a first overall time delay of the time delay unit. The at least one first delay circuit may be configured to receive an RF signal for the time delay unit, and the third external bypass connection may be configured to output the RF signal for the time delay unit.

The phased array antenna may further include a second external jumper coupled to the third and fourth external bypass connections to define a second overall time delay of the time delay unit. The at least one second delay circuit may be configured to receive an RF signal for the time delay unit, and the at least one third delay circuit may be configured to output the RF signal for the time delay unit.

The phased array antenna may further include first and second switches carried by the circuit substrate. The first switch may be coupled between the at least one first delay circuit and the at least one second delay circuit, and coupled to a first external bypass connection of the at least one external bypass connection. The second switch may be coupled between the at least one second delay circuit and the at least one third delay circuit, and coupled to a second external bypass connection of the at least one external bypass connection.

The first and second switches may be configured via the first and second external bypass connections to define a first overall time delay of the time delay unit. The at least one first delay circuit may be configured to receive an RF signal for the time delay unit, and the second external bypass connection may be configured to output the RF signal for the time delay unit.

The first and second switches may be configured via the first and second external bypass connections to define a second overall time delay of the time delay unit. The at least one second delay circuit may be configured to receive an RF signal via the first external bypass connection for the time delay unit, and the at least one third delay circuit may be configured to output the RF signal for the time delay unit.

Each delay circuit may include an input and an output, and a selectable reference/delay path between the input and output. The array of antenna elements may be arranged in a plurality of subarrays of antenna elements. The phased array antenna may further include a controller coupled to the plurality of time delay units.

The least one first delay circuit may include a plurality of input delay circuits having a collective signal delay value. The at least one second delay circuit may have an individual signal delay value. The at least one third delay circuit may include a plurality of output delay circuits having a collective signal delay value.

Another aspect is directed to a time delay unit (TDU) for a phased array antenna as described above. The time delay unit may include a circuit substrate, and a plurality of delay circuits carried by the circuit substrate and coupled in series. Each delay circuit may have a respective signal delay value. At least one external bypass connection may be carried by the circuit substrate and coupled to the plurality of delay circuits to configure an overall time delay of the time delay unit.

Yet another aspect is directed to a method for making a time delay unit (TDU) for a phased array antenna as described above. The time delay unit may include a plurality of delay circuits on a circuit substrate and coupled in series. Each delay circuit may have a respective signal delay value. The method includes forming a plurality of delay circuits on the circuit substrate, and forming at least one external bypass connection on the circuit substrate and coupled to the plurality of delay circuits to configure an overall time delay of the time delay unit.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations may be used to indicate similar elements in different embodiments.

Figure 1:
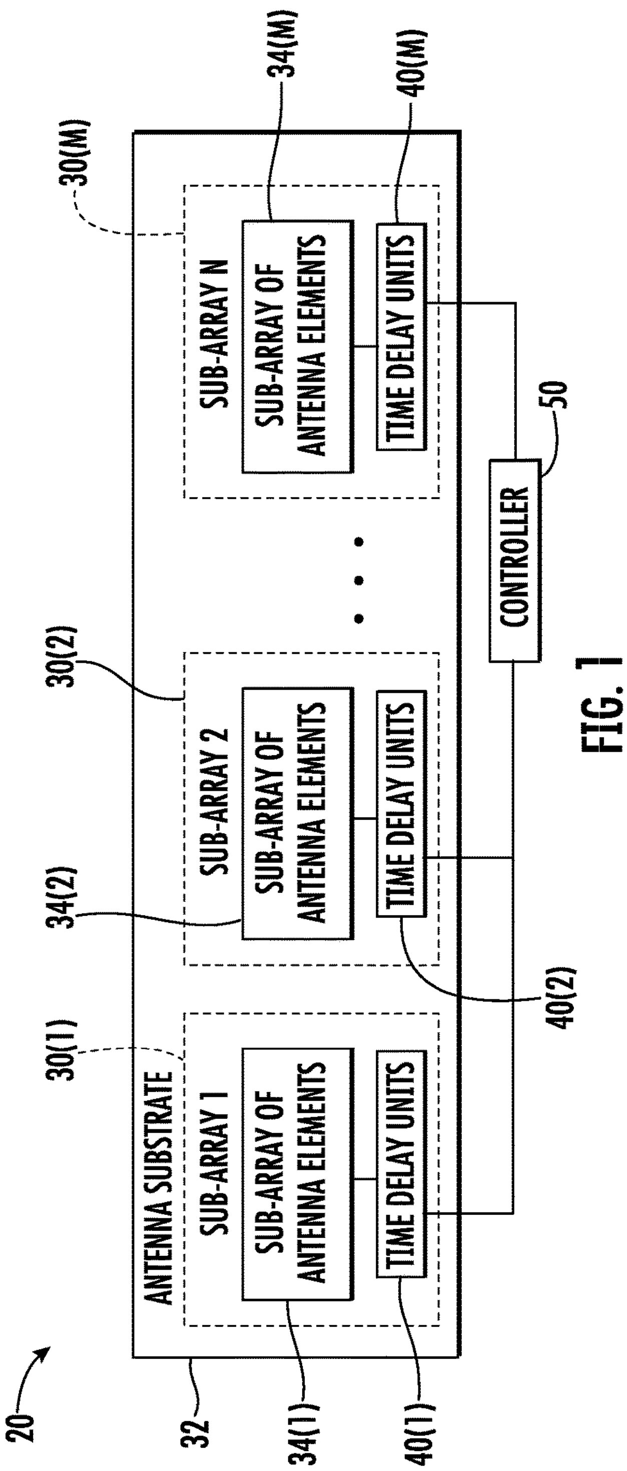
FIG. 1 is a schematic diagram of a phased array antenna with reconfigurable time delay units (TDUs) in which various aspects of the disclosure may be implemented.
Figure 2:
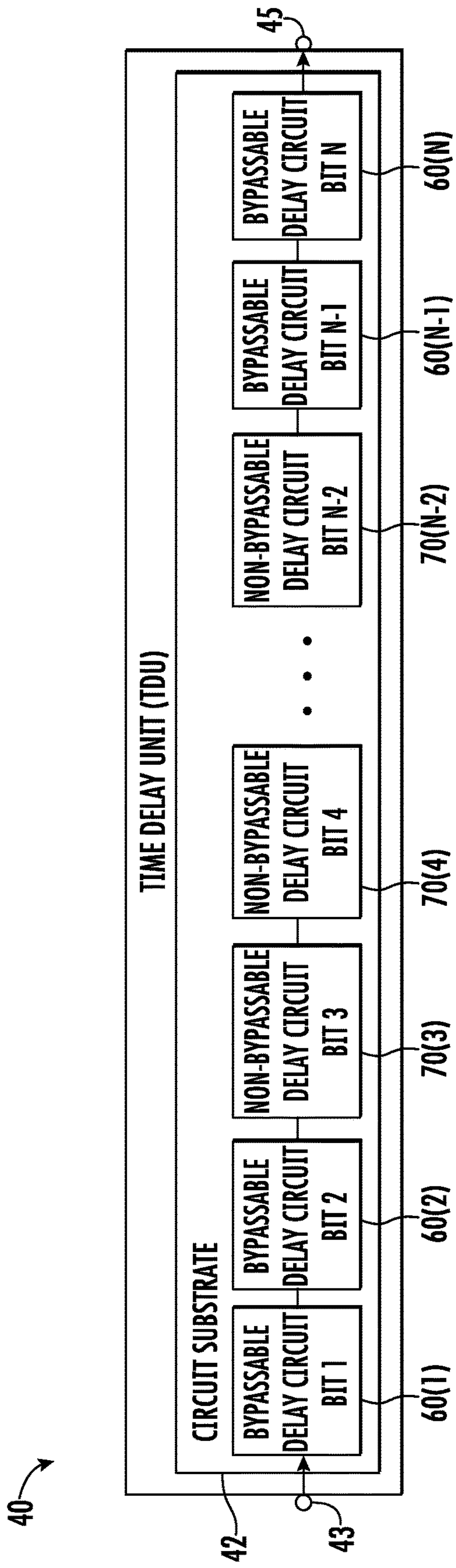
FIG. 2 is a block diagram of one of the reconfigurable time delay units illustrated in FIG. 1.

Referring initially to FIGS. 1 and 2, a phased array antenna 20 with reconfigurable time delay units (TDUs) 40(1)-40(M) will be discussed. The time delay units 40(1)-40(M) include bypassable delay circuits 60(1)-60(N) and non-bypassable delay circuits 70(3)-70(N−2) coupled in series. A controller 50 is coupled to the time delay units 40(1)-40(M) for control of the time delay units. The phased array antenna 20 includes sub-arrays 30(1)-30(M) carried by an antenna substrate 32. The respective sub-arrays 30(1)-30(M) include a sub-array antenna elements 34(1)-34(M). The time delay units 40(1)-40(M) may be generally referred to as time delay units 40. Each time delay unit 40 has an input 43 and an output 45 with the bypassable delay circuits 60 and the non-bypassable delay circuits 70 coupled in series therebetween.

The combined number of bypassable delay circuits 60(1)-60(N) and non-bypassable delay circuits 70(3)-70(N−2) adds up to N. The bypassable delay circuits 60(1)-60(N) may be generally referred to as bypassable delay circuits 60, and the non-bypassable delay circuits 70(3)-70(N−2) may be generally referred to as non-bypassable delay circuits 70. In addition, the sub-arrays 30(1)-30(M) may be generally referred to as sub-arrays 30.

The time delay units 40 may advantageously be configured to provide different hierarchical layers of time delays within the phased array architecture. The reconfigurable time delay units 40 avoid the need for custom-made time delay units typically designed on a case-by-case basis. Custom-made time delay units are expensive, non-reconfigurable and generally have long lead times for manufacture.

The hierarchical layers of time delays, for example, may include a high delay level and a low delay level. The high delay level is the delay needed between adjacent sub-arrays 30 for overall operation of the phased array antenna 20. The low delay level is the delay needed within each respective sub-array 30 to achieve a phase error requirement of the phased array antenna 20.

As will be described in greater detail below, each time delay unit 40 may advantageously be selectively configured for either the high delay level or for the low delay level. In contrast, a non-reconfigurable time delay unit only supporting the high delay level is not interchangeable with a non-reconfigurable time delay unit only supporting the low delay level. The non-reconfigurable time delay unit for the high delay level would provide too much loss to be used at the low delay level. Similarly, the non-reconfigurable time delay unit for the low delay level would provide too fine a resolution to be used at the high delay level.

Figure 3:
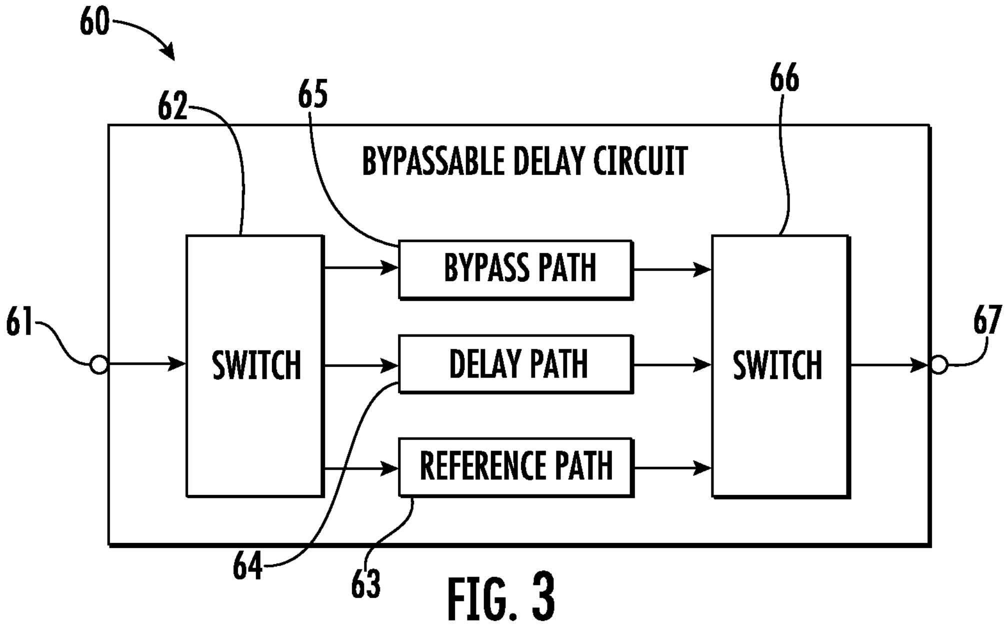
FIG. 3 is a block diagram of one of the bypassable delay circuits illustrated in FIG. 2.

Each bypassable delay circuit 60 has a circuit input 61 and a circuit output 67, with selectable paths therebetween, as shown in FIG. 3. The selectable paths include a reference path 63, a delay path 64 and a bypass path 65. An input switch 62 is coupled between the circuit input 61 and the selectable paths, and an output switch 66 is coupled between the selectable paths and the circuit output 67.

The input and output switches 62, 66 may be configured to select either the reference path 63, the delay path 64 or the bypass path 65. To avoid the need for an additional control line to be run for the bypass path 65, the bypassable delay circuit 60 may be hardwired for only the bypass path 65 or may be configured to select between the reference path 63 or the delay path 64. When the bypass path 65 is selected, then the bypassable delay circuit 60 is in a bypass mode. When the bypass path 65 is not selected, then the bypassable delay circuit 60 is switchable between the reference path 63 (i.e., a reference mode) or the delay path 64 (i.e., a delay mode).

Figure 4:
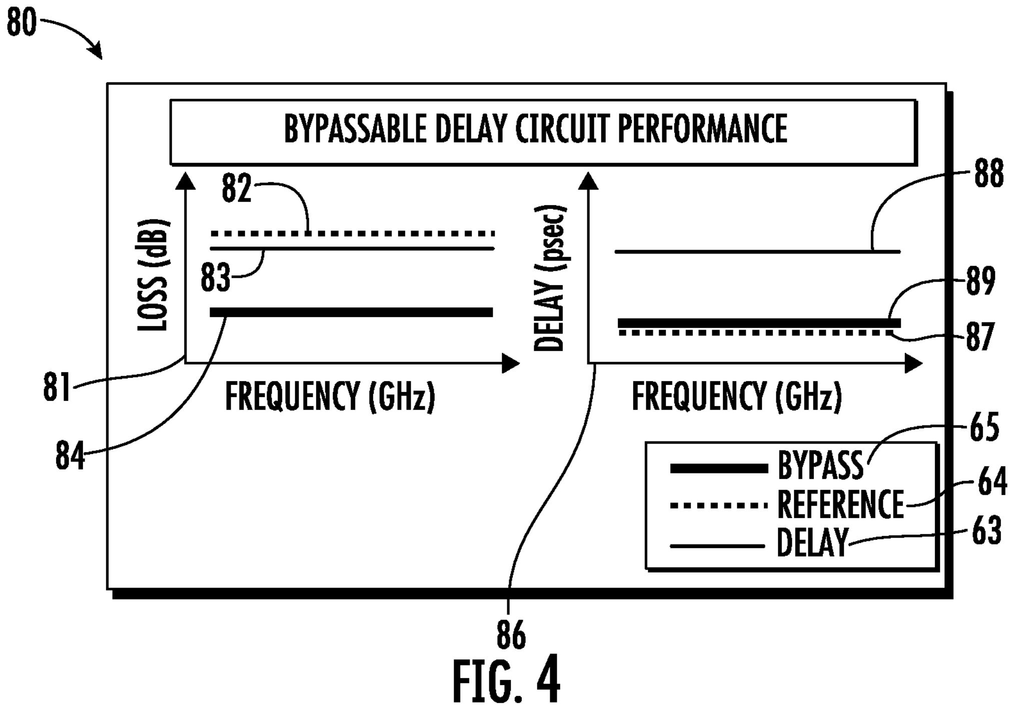
FIG. 4 is a performance chart for the bypassable delay circuit illustrated in FIG. 3.

A performance chart 80 for the bypassable delay circuit 60, as shown in FIG. 4, provides a signal loss graph 81 and a signal delay graph 86. The signal loss graph 81 corresponds to the respective signal loss values for the reference path 63, the delay path 64 and the bypass path 65 within the bypassable delay circuit 60.

In the signal loss graph 81, the reference path 63 corresponds to a dashed line 82, the delay path 64 corresponds to a thin solid line 83, and the bypass path 65 corresponds to a thick solid line 84. Each of the selectable paths has a signal loss value associated therewith. If the reference path 63 is selected or if the delay path 64 is selected, then the signal loss value (dashed line 82 or thin solid line 83) is substantially the same for each of these paths. If the bypass path 65 is selected, then the signal loss value (thick solid line 84) is lower as compared to the signal loss values for the reference path 63 and for the delay path 64. The bypass path 65 advantageously provides a low loss path for the RF signal passing though the bypassable delay circuit 60.

The signal delay graph 86 corresponds to the respective signal delay values for the reference path 63, the delay path

64 and the bypass path 65 within the bypassable delay circuit 60. In the signal delay graph 86, the reference path 63 corresponds to a dashed line 87, the delay path 64 corresponds to a thin solid line 88, and the bypass path 65 corresponds to a thick solid line 89. Each of the selectable paths has a signal delay value associated therewith. The signal delay value corresponding to the reference path 63 (dashed line 87) is less than the signal delay value corresponding to the delay path 64 (thin solid line 88). The signal delay value corresponding to the bypass path 65 (thick solid line 89) is about the same as the signal delay value for the reference path 63.

Figure 5:
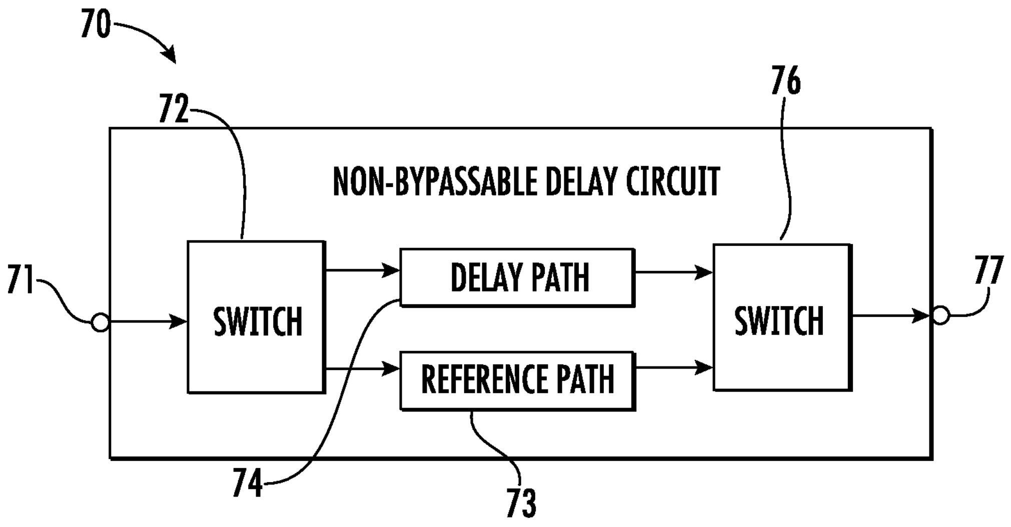
FIG. 5 is a block diagram of one of the non-bypassable delay circuits illustrated in FIG. 2.

Each non-bypassable delay circuit 70 has a circuit input 71 and a circuit output 77, with selectable paths therebetween, as shown in FIG. 5. The selectable paths include a reference path 73 and a delay path 74. An input switch 72 is coupled between the circuit input 71 and the selectable paths, and an output switch 76 is coupled between the selectable paths and the circuit output 77.

The input and output switches 72, 76 may be configured to select either the reference path 73 or the delay path 74. When the reference path 73 is selected, then the non-bypassable delay circuit 70 is in a reference mode. When the delay path 74 is selected, then the non-bypassable delay circuit 70 is in a delay mode.

Figure 6:
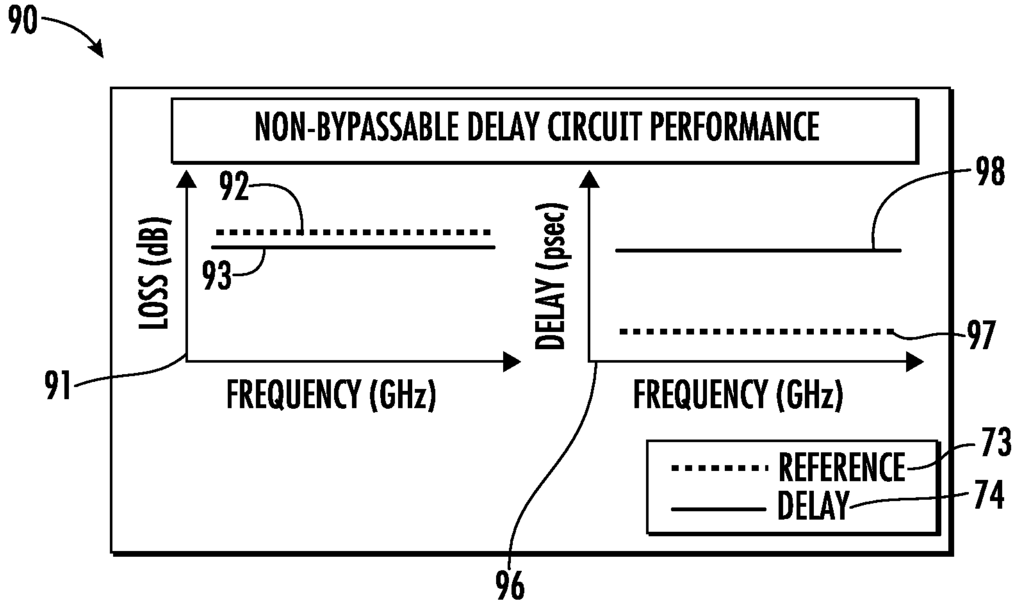
FIG. 6 is a performance chart for the non-bypassable delay circuit illustrated in FIG. 5.

A performance chart 90 for the non-bypassable delay circuit 70, as shown in FIG. 6, provides a signal loss graph 91 and a signal delay graph 96. The signal loss graph 91 corresponds to the respective signal loss values for the reference path 73 and the delay path 74 within the non-bypassable delay circuit 70.

In the signal loss graph 91, the reference path 73 corresponds to a dashed line 92, and the delay path 74 corresponds to a thin solid line 93. Each of the selectable paths has a signal loss value associated therewith. If the reference path 73 is selected or if the delay path 74 is selected, then the signal loss value (dashed line 92 or thin solid line 93) is substantially the same for each of these paths.

The signal delay graph 96 corresponds to the respective signal delay values for the reference path 73 and the delay path 74 within the non-bypassable delay circuit 70. In the signal delay graph 96, the reference path 73 corresponds to a dashed line 97 and the delay path 74 corresponds to a thin solid line 98. Each of the selectable paths has a signal delay value associated therewith. The signal delay value corresponding to the reference path 73 (dashed line 97) is less than the signal delay value corresponding to the delay path 74 (thin solid line 98).

Figure 7:
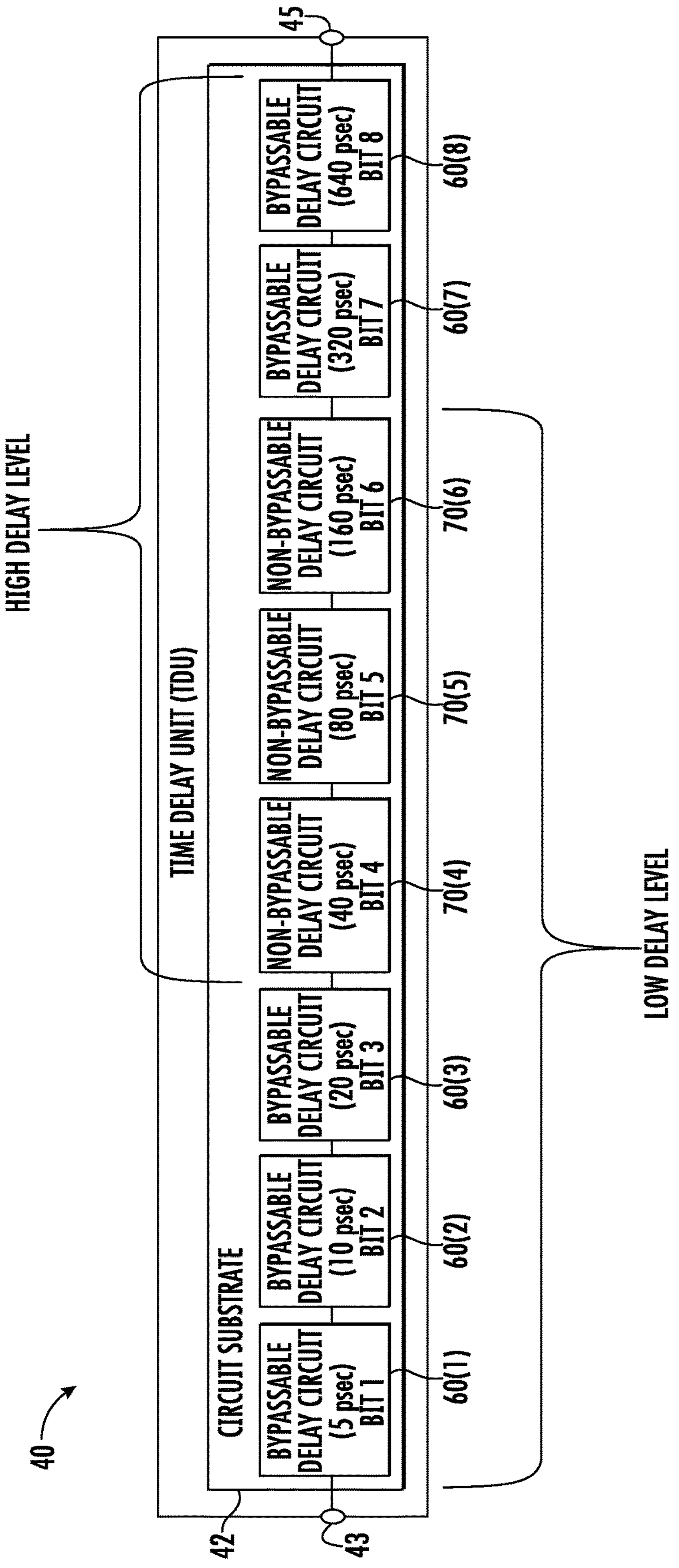
FIG. 7 is a block diagram of the reconfigurable time delay unit illustrated in FIG. 2 with 8 time delay bits and example signal delay values.

Referring now to FIG. 7, an 8-bit time delay unit 40 will be discussed with example signal delay values for the delay paths 64 in the bypassable delay circuits 60 and for the delay paths 74 in the non-bypassable delay circuits 70. Each bit within the 8-bit time delay unit 40 may be referred to as a time delay bit. The size of the time delay unit 40 is not to be limiting since the number of time delay bits will vary in different applications. As noted above, the time delay units 40 may be configured to support a high delay level or a low delay level.

The high delay level is the delay needed between adjacent sub-arrays 30 for overall operation of the phased array antenna 20. The low delay level is the delay needed within each respective sub-array 30 to achieve a phase error requirement of the phased array antenna 20.

The low delay level is supported by bypassable delay circuits 60(1), 60(2), 60(3) and non-bypassable delay circuits 70(4), 70(5), 70(6). For the low delay level, the respective signal delay values vary from 5 psec to 160 psec. These signal delay values correspond to selection of the delay path 64 in the bypassable delay circuits 60(1), 60(2), 60(3) and the delay path 74 in the non-bypassable delay circuits 70(4), 70(5), 70(6).

Since the signal delay values for the delay paths 64 in the bypassable delay circuits 60(7), 60(8) are not needed for the low delay level, the bypass paths 65 are selected. Even though the RF signal travels from the input 43 to the output 45 of the time delay unit 40, the bypass paths 65 are low loss paths so performance of the time delay unit 40 is minimally effected.

The high delay level is supported by non-bypassable delay circuits 70(4), 70(5), 70(6) and bypassable delay circuits 60(7), 60(8). For the high delay level, the respective signal delay values vary from 40 psec to 640 psec. The signal delay values correspond to selection of the delay path 74 in the non-bypassable delay circuits 70(4), 70(5), 70(6) and the delay path 64 in the bypassable delay circuits 60(1), 60(2), 60(3).

Since the signal delay values for the delay paths 64 in the bypassable delay circuits 60(1), 60(2), 60(3) are not needed for the high delay level, the bypass paths 65 are selected. As above, even though the RF signal travels from the input 43 to the output 45 of the time delay unit 40, the bypass paths 65 are low loss paths so performance of the time delay unit 40 is minimally effected.

The non-bypassable delay circuits 70(4), 70(5), 70(6) are non-bypassable since they are needed for when the time delay unit 40 is configured to support both the high and low delay levels. Here, the non-bypassable delay circuits 70(4), 70(5), 70(6) may be operated using the reference paths 63 or the delay paths 64 depending on the desired signal delay values associated with these delay circuits.

The bypass paths 65 are selected in the bypassable delay circuits 60(1), 60(2), 60(3) since the delay paths 64 are not needed when the time delay unit 40 is configured to support the high delay level. Likewise, the bypass paths 65 are selected in the bypassable delay circuits 60(7), 60(8) since the delay paths 64 are not needed when the time delay unit 40 is configured to support the low delay level.

Figure 8:
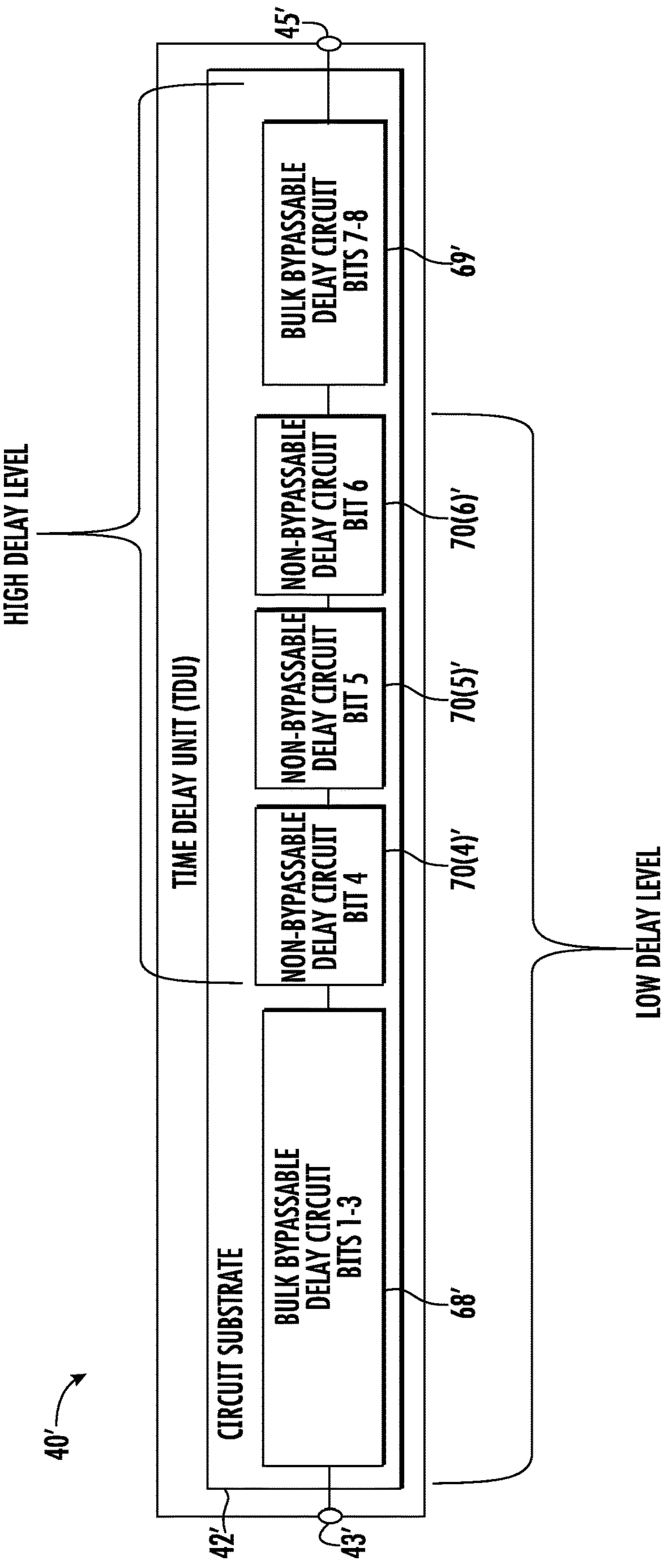
FIG. 8 is a block diagram of another embodiment of the reconfigurable time delay unit illustrated in FIG. 7 with bulk bypassable delay circuits.

Another embodiment of the time delay unit 40' is based on the use of bulk bypassable delay circuits 68', 69' as shown in FIG. 8. Bulk bypassable delay circuit 68' collectively represents bypassable delay circuits 60(1), 60(2), 60(3). Bulk bypassable delay circuit 69' collectively represents bypassable delay circuits 60(7), 60(8).

As the name implies, when the bypass paths 65' in the bulk bypassable delay circuit 68' are selected, all three bypass paths are collectively selected. This is the opposite of the bypassable delay circuits 60(1), 60(2), 60(3) where the respective bypass paths 65 are individually selected. Similarly, when the bypass paths 65' in the bulk bypassable delay circuit 69' are selected, they are both collectively selected. Again, this is the opposite of the bypassable delay circuits 60(7), 60(8) where the respective bypass paths 65 are individually selected.

The bulk bypassable delay circuits 68', 69' provide less flexibility than the bypassable delay circuits 60(1), 60(2), 60(3) and 60(7), 60(8) in the time delay unit 40, but allow for increased performance since less switches are being used in the bulk bypassable delay circuits 68', 69'.

Each bulk bypassable delay circuit 68', 69' includes a single input switch and a single output switch with a bulk bypass path 65' connected therebetween. Less switches means lower losses for the time delay unit 40'. If the bulk bypass path 65' is not selected, then the reference path 63' or the delay path 64' in the bulk bypassable delay circuits 68', 69' are also selected all at the same time, that is, collectively or in bulk.

Figure 9:
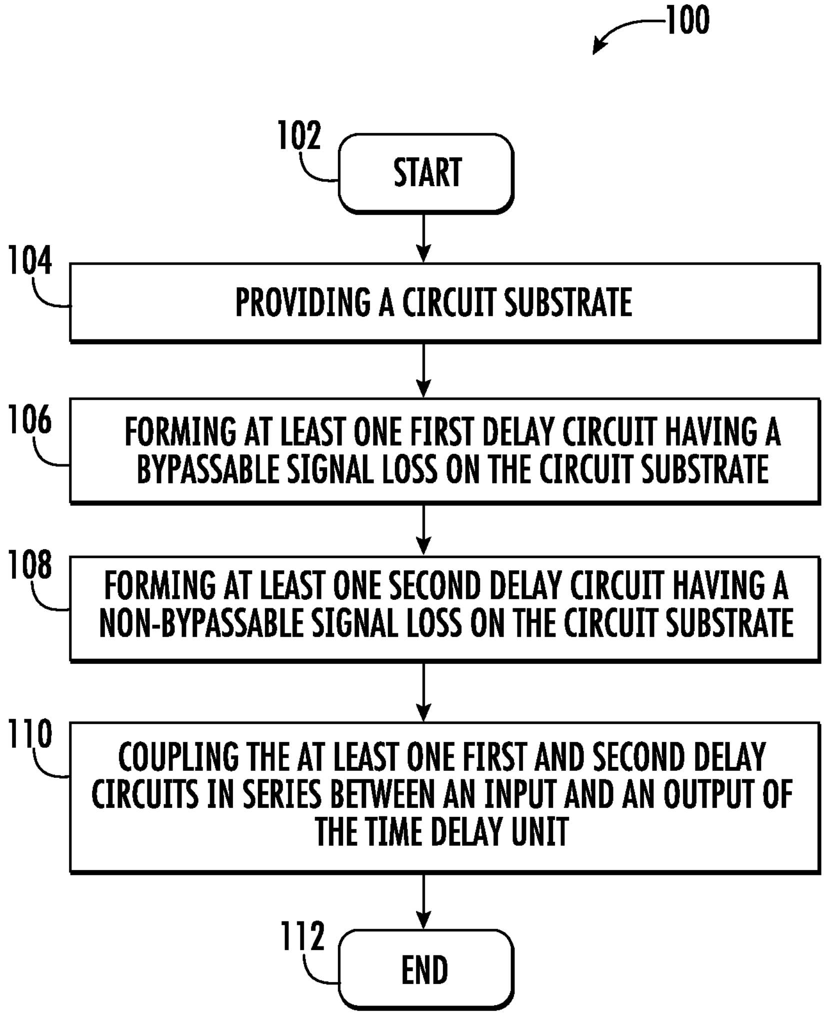
FIG. 9 is a flow diagram on a method for making the reconfigurable time delay unit illustrated in FIG. 2.

Referring now to FIG. 9, a flow diagram 100 on a method for making a time delay unit 40 for the phased array antenna 20 will be discussed. From the start (Block 102), a circuit substrate 42 is provided at Block 104. At least one first delay circuit 60 having a bypassable signal loss is formed on the circuit substrate 42 at Block 106. At least one second delay circuit 70 having a non-bypassable signal loss is formed on the circuit substrate 42 at Block 108. The method further includes at Block 110 coupling the at least one first and second delay circuits 60, 70 in series between an input 43 and an output 45 of the time delay unit 40. The method ends at Block 112.

Figure 10:
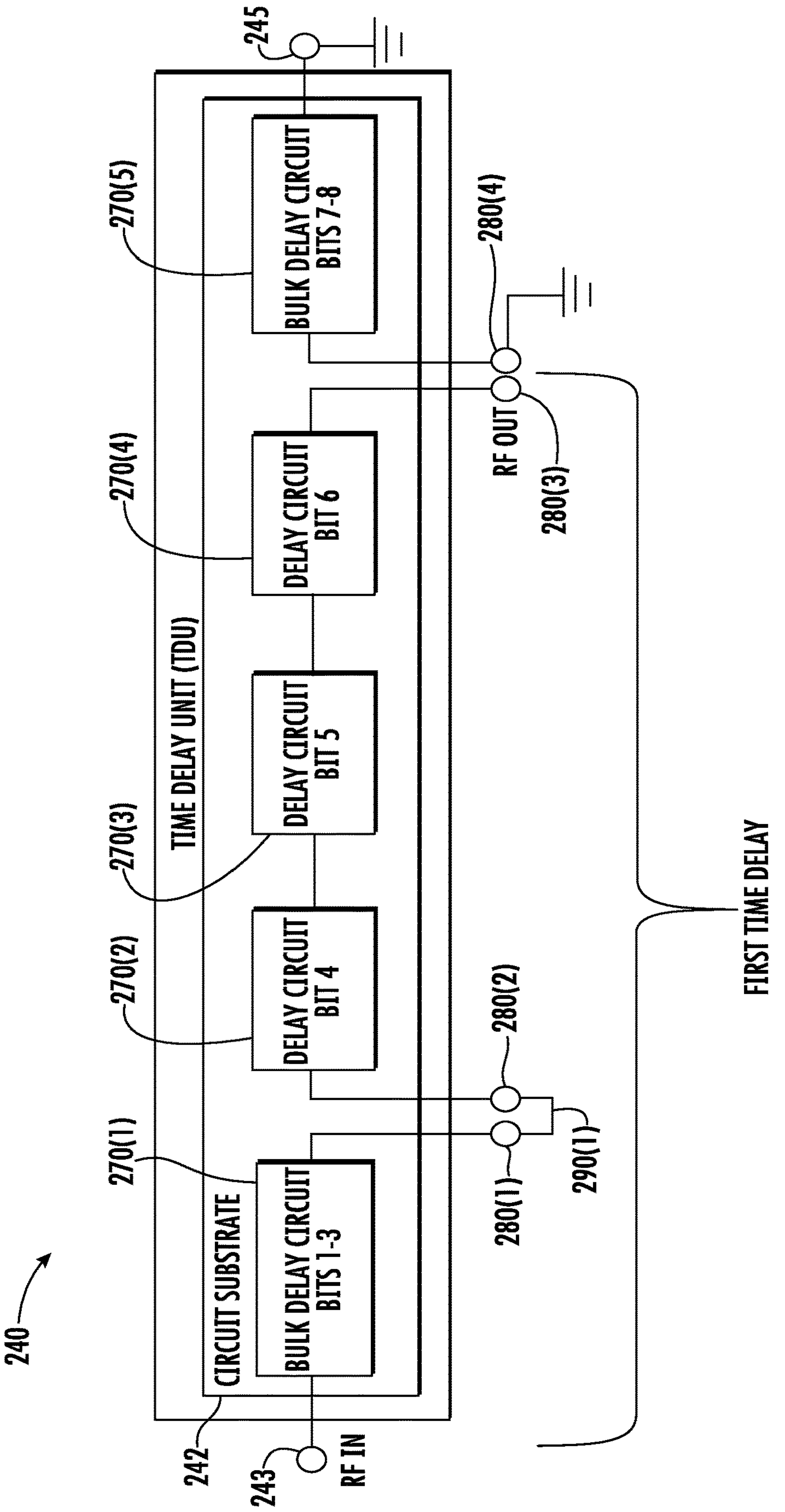
FIGS. 10-12 are block diagrams of another embodiment of the reconfigurable time delay unit illustrated in FIG. 2 with external bypass connections configured for different time delays.
Figure 11:
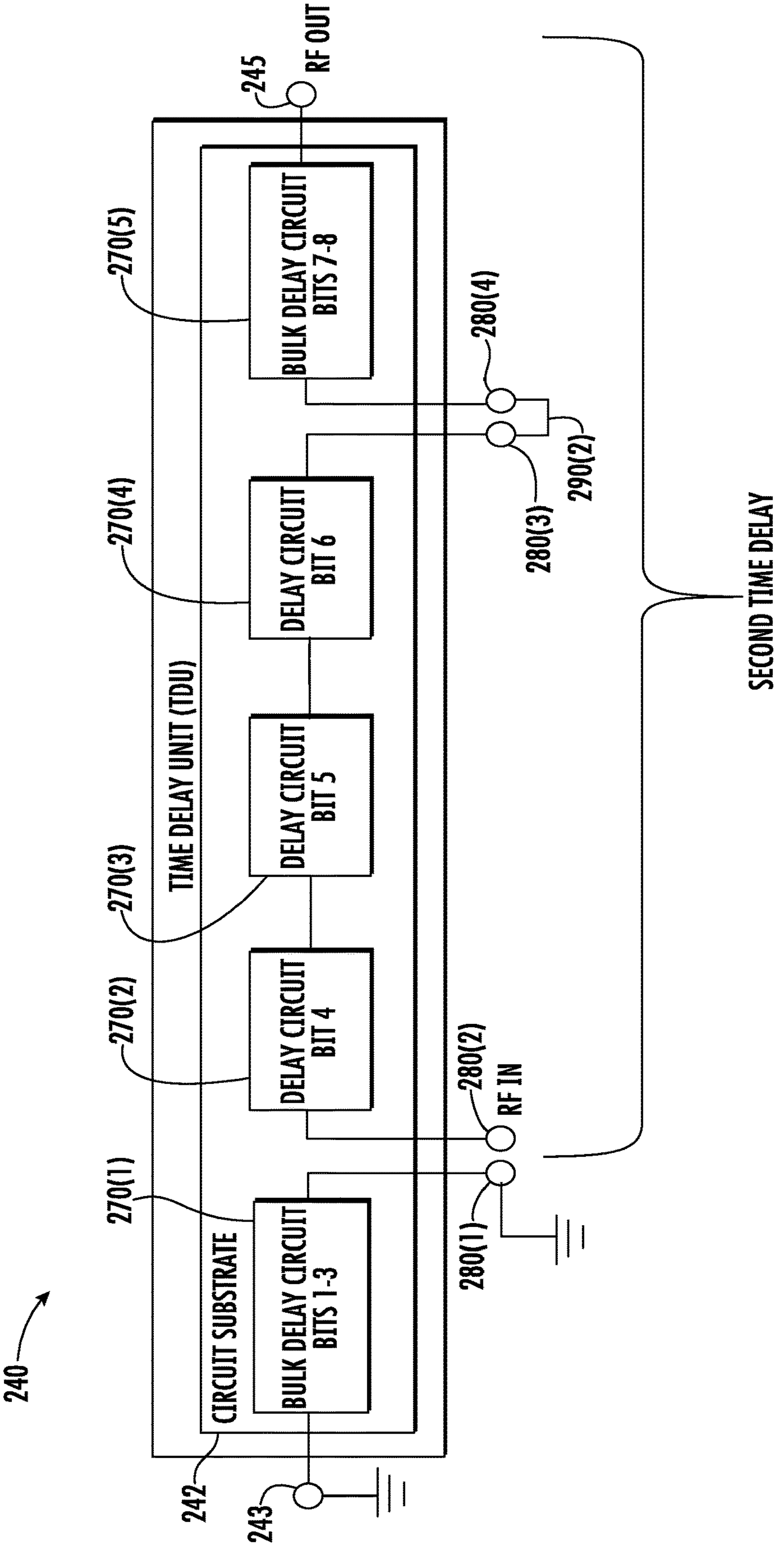
Figure 12:
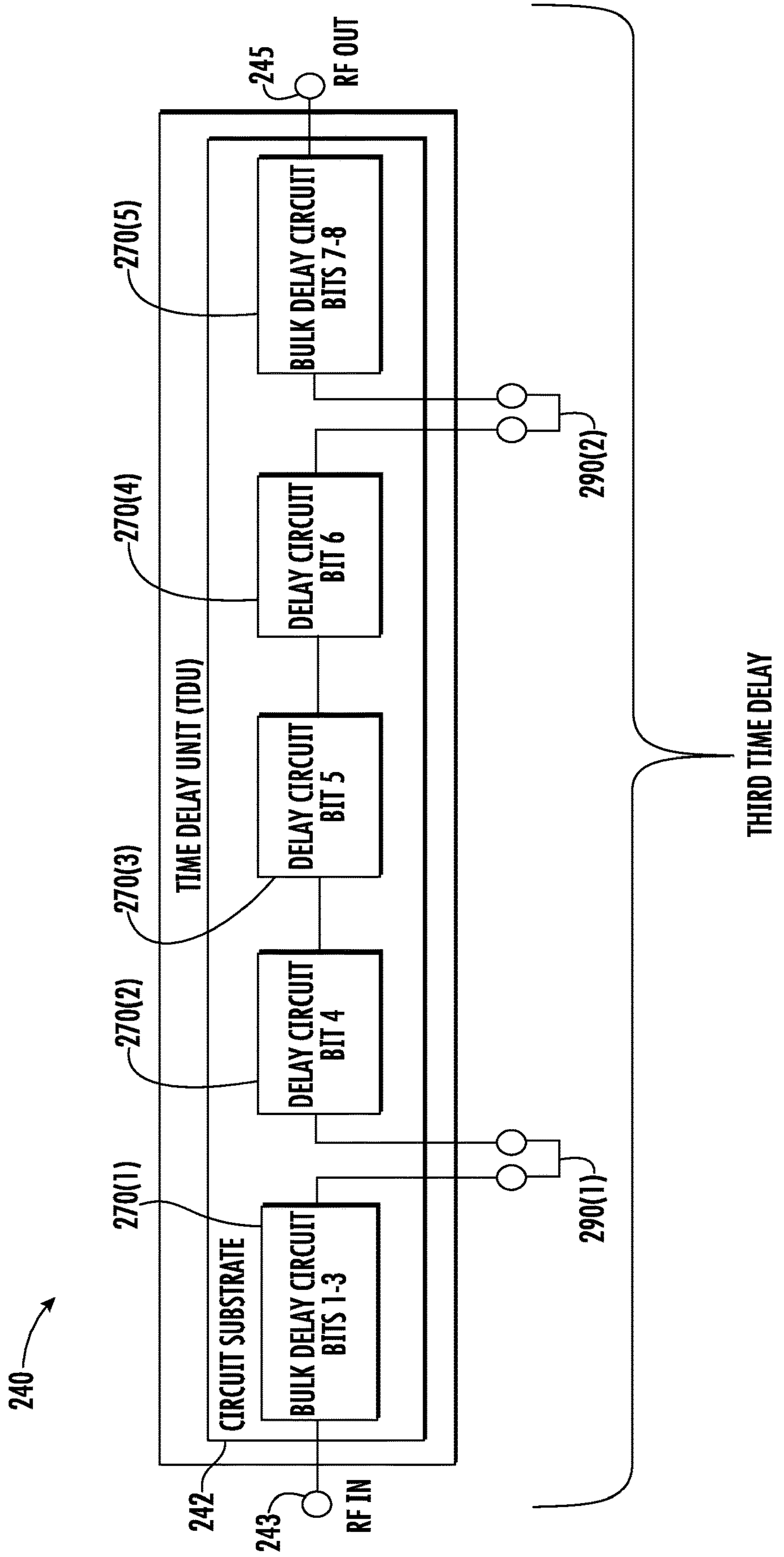

Referring now to FIGS. 10-12, another aspect of the present description is directed to a time delay unit 240 with external bypass connections 280(1)-280(4) used to configure a time delay of the time delay unit 240. The time delay unit 240 may advantageously be configured to support multiple layers of time delay within the phased array architecture. Certain reference numbers as used above are preceded by a 2 to refer to like elements.

The time delay unit 240 includes a circuit substrate 242, and delay circuits 270(1)-270(5) carried by the circuit substrate 242 and coupled in series. Each delay circuit 270(1)-270(5) has a respective signal delay value. External bypass connections 280(1)-280(4) are carried by the circuit substrate 242 and are coupled to the delay circuits 270(1)-270(5) to configure a time delay of the time delay unit 240.

The delay circuits 270(1)-270(5) include at least one first delay circuit 270(1), at least one third delay circuit 270(5), and a plurality of second delay circuits 270(2)-270(4) between the at least one first delay circuit 270(1) and the at least one third delay circuit 270(5). For discussion purposes, the at least one first delay circuit 270(1) will be referred to as a first delay circuit 270(1), and the at least one third delay circuit 270(5) will be referred to as a third delay circuit 270(5).

The time delay unit 240 may be an 8-bit time delay unit, for example. Each bit within the 8-bit time delay unit 240 may be referred to as a time delay bit. The size of the time delay unit 240 is not to be limiting since the number of time delay bits will vary in different applications.

The first delay circuit 270(1) is configured as a bulk delay circuit and includes time delay bits 1-3. The second delay circuits 270(2), 270(3), 270(4) are separate from one another. Second delay circuit 270(2) is time delay bit 4, second delay circuit 270(3) is time delay bit 5, and second delay circuit 270(4) is time delay bit 6. The third delay circuit 270(5) is also configured as a bulk delay circuit and includes time delay bits 7-8.

Each of the delay circuits 270(1)-270(5) are non-bypassable delay circuits since they do not include bypass paths as discussed above. The bypass paths are not needed since the first delay circuit 270(1) and the third delay circuit 270(5) may be selectively bypassed via the external bypass connections 280(1)-280(4). As described above, each delay circuit 270(1)-270(5) includes a reference path and a delay path, with the delay path having a signal delay value associated therewith.

Since the first delay circuit 270(1) is a bulk delay circuit and represents time delay bits 1-3, the three reference paths may be collectively selected or the three delay paths may be collectively selected. In contrast, each of the second delay circuits 270(2), 270(3), 270(4) represent a respective time delay bit that includes an individually selectable reference path or an individually selectable delay path. Since the third delay circuit 270(5) is also a bulk delay circuit and represents time delay bits 7-8, the two reference paths may be collectively selected or the two delay paths may be collectively selected.

The time delay unit 240 is configured via the external bypass connections 280(1)-280(4) using first and second external jumpers 290(1), 290(2) to support multiple layers of time delay. In one time delay configuration, the upper time delay bits 7-8 in the third delay circuit 270(5) are bypassed for a first time delay, as illustrated in FIG. 10.

In the first time delay, an RF input signal is applied to input 243 of the first delay circuit 270(1). A first external jumper 290(1) is coupled across the first and second external bypass connections 280(1), 280(2). The RF input signal passes through the first delay circuit 270(1) and the second delay circuits 270(2)-270(4). An output of the second delay circuit 270(4) is coupled to the third external bypass connection 280(3). The third external bypass connection 280(3) functions as an RF output to provide an RF output signal for the time delay unit 240. Since the upper time delay bits 7-8 in delay circuit 270(5) are bypassed, a ground is applied to the fourth external bypass connection 280(4) and to an output 245 of the third delay circuit 270(5).

In another time delay configuration for the time delay unit 240, the lower time delay bits 1-3 in the first delay circuit 270(1) are bypassed for a second time delay, as illustrated in FIG. 11. Since the lower time delay bits 1-3 are bypassed, a ground is applied to the input 243 of the first delay circuit 270(1) and to the first external bypass connection 280(1).

The second external bypass connection 280(2) is configured as an RF input since an RF input signal is applied to the second delay circuit 270(2). A second external jumper 290(2) is coupled across the third and fourth external bypass connections 280(3), 280(4). The RF input signal passes through the second delay circuits 270(2)-270(4) and through the third delay circuit 270(5). The output 245 of the third delay circuit 270(5) functions as an RF output to provide an RF output signal for the time delay unit 240.

In yet another time delay configuration for the time delay unit 240, the lower time delay bits 1-3 are not bypassed and the upper time delay bits 7-8 are not bypassed for a third time delay, as illustrated in FIG. 12. Instead, the first external jumper 290(1) is coupled across the first and second external bypass connections 280(1), 280(2). Likewise, the second external jumper 290(2) is coupled across the third and fourth external bypass connections 280(3), 280(4).

An RF input signal is applied to input 243 of the first delay circuit 270(1). The RF input signal passes through the first delay circuit 270(1), the second delay circuits 270(2)-270(4) and the third delay circuit 270(5). The output 245 of the third delay circuit 270(5) functions as an RF output to provide an RF output signal for the time delay unit 240.

Figure 13:
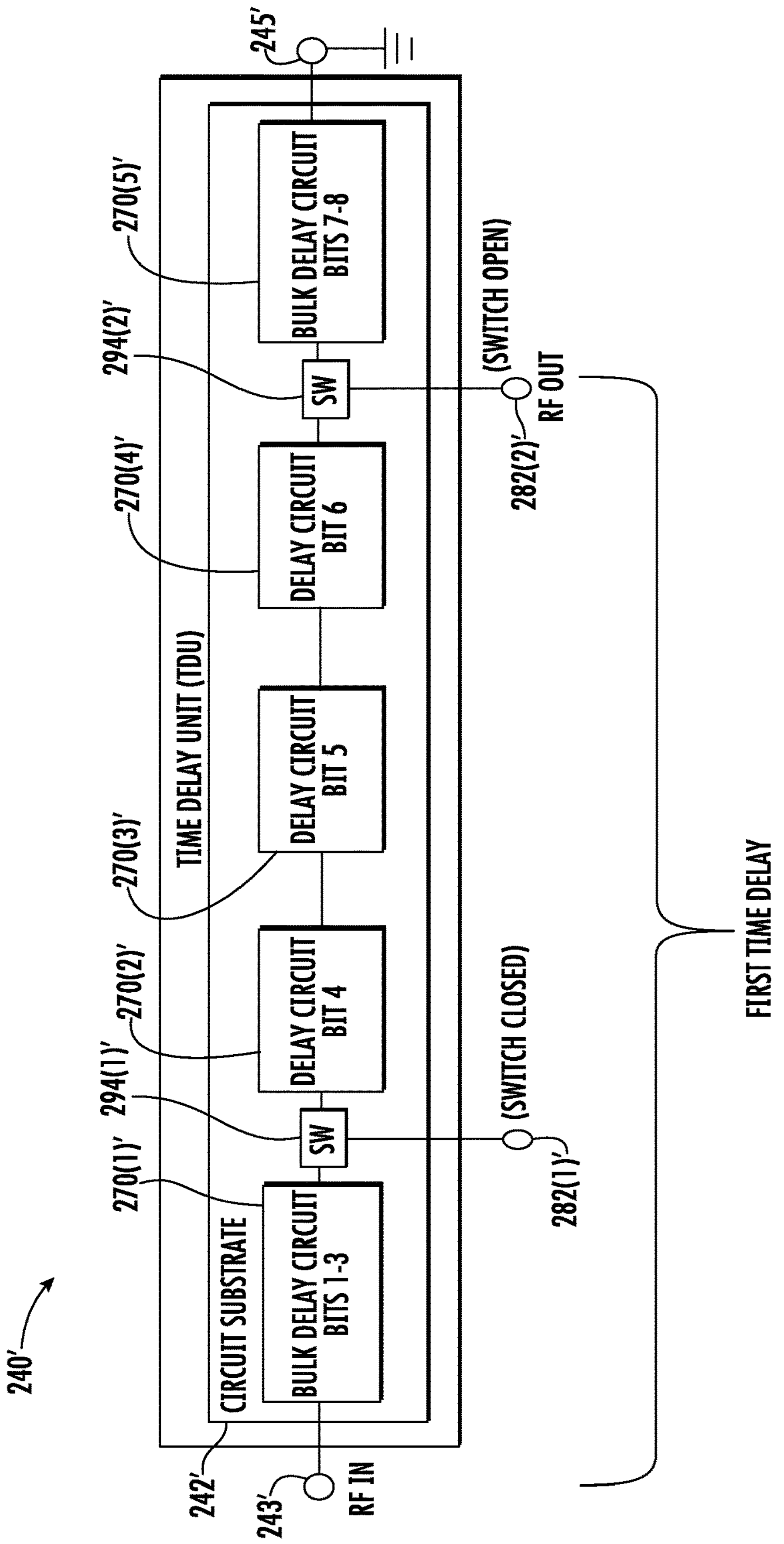
FIGS. 13-15 are block diagrams of another embodiment of the reconfigurable time delay unit illustrated in FIG. 10 with switches and external bypass connections configured for different time delays.
Figure 14:
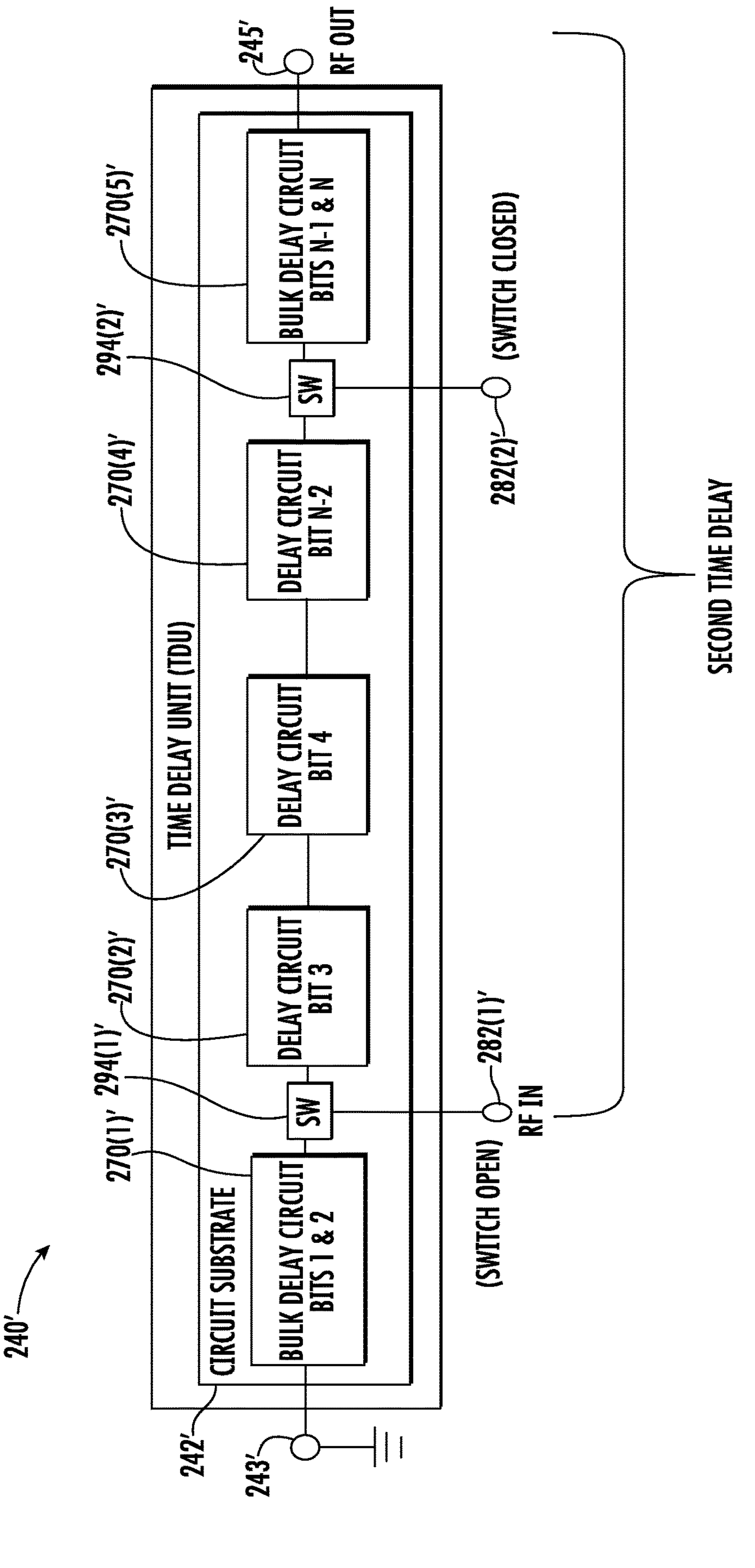
Figure 15:
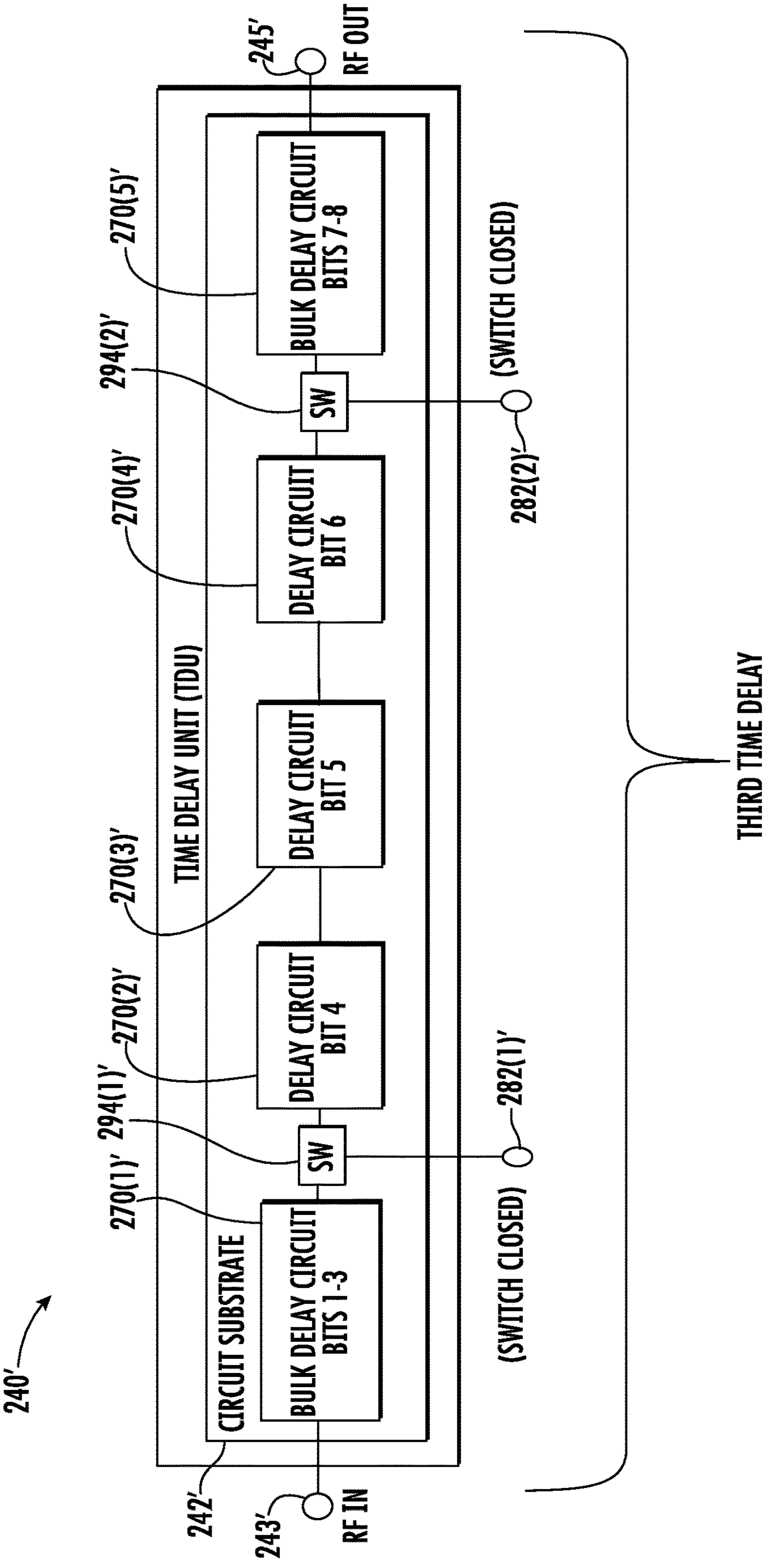

Referring now to FIGS. 13-15, another embodiment of the time delay unit 240 will be discussed. In this embodiment, the time delay unit 240' includes switches 294(1)', 294(2)' and external bypass connections 282(1)', 282(2)' used to configure a time delay of the time delay unit 240'. The time delay unit 240' may advantageously be configured to support multiple layers of time delay within the phased array architecture.

A first switch 294(1)' is carried by the circuit substrate 242' and is coupled between the first delay circuit 270(1)' and the second delay circuit 270(2)'. A first external bypass connection 282(1)' is coupled to the first switch 294(1)'. The first switch 294(1)' may be closed or open depending on the desired time delay.

A second switch 294(2)' is carried by the circuit substrate 242' and is coupled between the second delay circuit 270(4)' and the third delay circuit 270(5)'. A second external bypass connection 282(2)' is coupled to the second switch 294(2)'. The second switch 294(2)' may be closed or open depending on the desired time delay.

In one time delay configuration, the upper time delay bits 7-8 in the third delay circuit 270(5)' are bypassed for a first time delay, as illustrated in FIG. 13. In the first time delay, an RF input signal is applied to input 243' of the first delay circuit 270(1)'.

The first switch 294(1)' is closed so that the RF input signal passes through the first delay circuit 270(1)' and the second delay circuits 270(2)'-270(4)'. The first external bypass connection 282(1)' is not used. The second switch 294(2)' is open so that the second external bypass connection 282(2)' is configured as an RF output to provide an RF output signal for the time delay unit 240'. The output 245' of the third delay circuit 270(5)' is grounded.

In another time delay configuration for the time delay unit 240', the lower time delay bits 1-3 in the first delay circuit 270(1) are bypassed for a second time delay, as illustrated in FIG. 14. Since the lower time delay bits 1-3 are bypassed, a ground is applied to the input 243 of the first delay circuit 270(1) and the first switch 294(1)' is open.

With the first switch 294(1)' open, the first external bypass connection 282(1)' is configured as an RF input. An RF input signal applied to the first external bypass connection 282(1)' passes through the second delay circuits 270(2)'-270(4)'. The second switch 294(2)' is closed so that the RF input signal passes through the second switch 294(2)' to the third delay circuit 270(5)'. The output 245' of the third delay circuit 270(5)' functions as an RF output to provide an RF output signal for the time delay unit 240'.

In yet another time delay configuration for the time delay unit 240', the lower time delay bits 1-3 are not bypassed and the upper time delay bits 7-8 are not bypassed for a third time delay, as illustrated in FIG. 15. In this configuration, both the first and second switches 294(1)', 294(2)' are closed. The first and second external bypass connections 282(1)', 282(2)' are not used.

An RF input signal is applied to input 243' of the first delay circuit 270(1)'. The RF input signal passes through the first delay circuit 270(1)', the second delay circuits 270(2)'-270(4)' and the third delay circuit 270(5)'. The output 245' of the third delay circuit 270(5)' functions as an RF output to provide an RF output signal for the time delay unit 240'.

Figure 16:
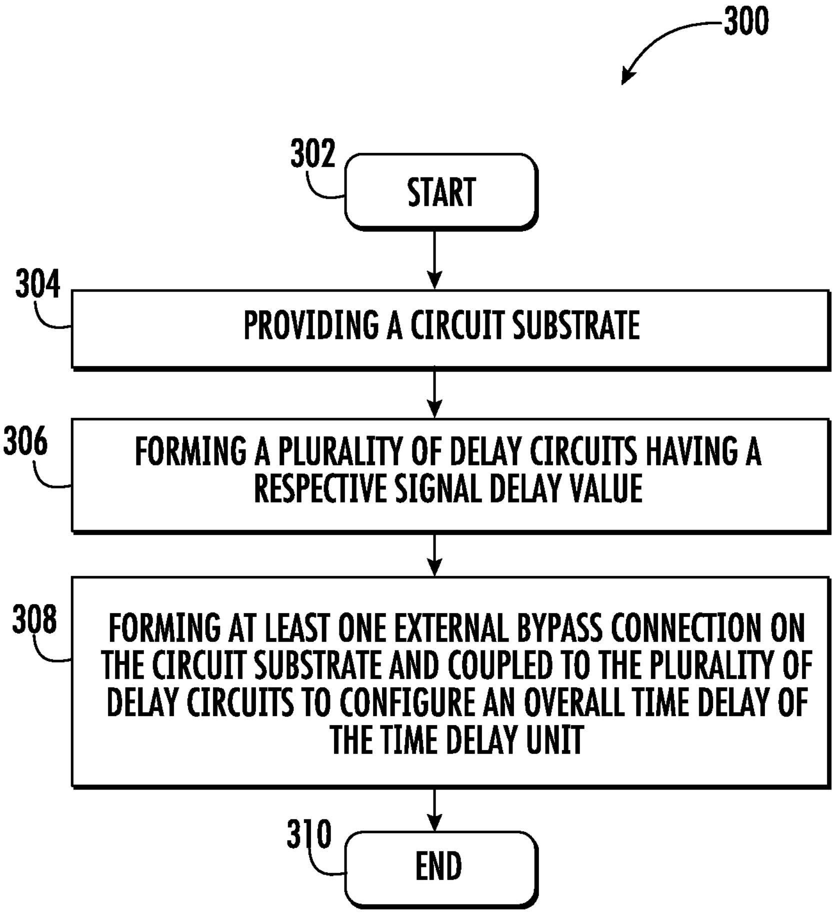
FIG. 16 is a flow diagram on a method for making the reconfigurable time delay unit illustrated in FIGS. 10-15.

Referring now to FIG. 16, a flow diagram 300 on a method for making a time delay unit 240' for a phased array antenna architecture will be discussed. From the start (Block 302), a circuit substrate 242 is provided at Block 304. A plurality of delay circuits 270(1)-270(5) are formed on the circuit substrate 242 at Block 306. Each delay circuit 270(1)-270(5) has a respective signal delay value. At least one external bypass connection 280(1)-280(4) is formed on the circuit substrate 242 at Block 308 and coupled to the plurality of delay circuits 270(1)-270(5) to configure a time delay of the time delay unit 240. The method ends at Block 310.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A phased array antenna comprising:
- an antenna substrate;
- an array of antenna elements carried by the antenna substrate; and
- a plurality of time delay units (TDUs) coupled to the array of antenna elements, each time delay unit comprising a circuit substrate,
  - a plurality of delay circuits carried by the circuit substrate and arranged in series, each delay circuit having a respective signal delay value, and
  - at least one external bypass connection carried by the circuit substrate, coupled to at least one of the plurality of delay circuits, and configured to be directly coupled to at least one conductive jumper external from the circuit substrate to configure an overall time delay of the time delay unit based upon the at least one conductive jumper external from the circuit substrate.

2. The phased array antenna of claim 1, wherein the plurality of delay circuits comprise:
- at least one first delay circuit;
- at least one third delay circuit; and
- at least one second delay circuit between the at least one first delay circuit and the at least one third delay circuit.

3. The phased array antenna of claim 2, wherein the at least one external bypass connection comprises:
- a first external bypass connection coupled to an output of the at least one first delay circuit;
- a second external bypass connection coupled to an input of the at least one second delay circuit;
- a third external bypass connection coupled to an output of the at least one second delay circuit; and
- a fourth external bypass connection coupled to an input of the at least one third delay circuit.

4. The phased array antenna of claim 3, comprising a first external jumper coupled to the first and second external bypass connections; and wherein the at least one first delay circuit is configured to receive an RF signal for the time delay unit, and the third external bypass connection is configured to output the RF signal for the time delay unit.

5. The phased array antenna of claim 3, comprising a second external jumper coupled to the third and fourth external bypass connections; and wherein the at least one second delay circuit is configured to receive an RF signal for the time delay unit and the at least one third delay circuit is configured to output the RF signal for the time delay unit.

6. The phased array antenna of claim 1, wherein each delay circuit comprises:
- an input and an output; and
- a selectable reference/delay path between the input and output.

7. The phased array antenna of claim 1, wherein the array of antenna elements are arranged in a plurality of subarrays of antenna elements.

8. The phased array antenna of claim 1, comprising a controller coupled to the plurality of time delay units.

9. The phased array antenna of claim 2, wherein the at least one first delay circuit comprises a plurality of input delay circuits having a collective signal delay value; wherein the at least one second delay circuit has an individual signal delay value; and wherein the at least one third delay circuit comprises a plurality of output delay circuits having a collective signal delay value.

10. A time delay unit (TDU) for a phased array antenna comprising an antenna substrate and an array of antenna elements carried by the antenna substrate, the time delay unit comprising:

a circuit substrate;

a plurality of delay circuits carried by the circuit substrate and arranged in series, each delay circuit having a respective signal delay value; and at least one external bypass connection carried by the circuit substrate, coupled to at least one of the plurality of delay circuits, and configured to be directly coupled to at least one conductive jumper external from the circuit substrate to configure an overall time delay of the time delay unit based upon the at least one conductive jumper external from the circuit substrate.

11. The time delay unit of claim 10, wherein the plurality of delay circuits comprise:

at least one first delay circuit;

at least one third delay circuit; and at least one second delay circuit between the at least one first delay circuit and the at least one third delay circuit.

12. The time delay unit of claim 11, wherein the at least one external bypass connection comprises:

a first external bypass connection coupled to an output of the at least one first delay circuit;

a second external bypass connection coupled to an input of the at least one second delay circuit;

a third external bypass connection coupled to an output of the at least one second delay circuit; and a fourth external bypass connection coupled to an input of the at least one third delay circuit.

13. The time delay unit of claim 12, comprising a first external jumper coupled to the first and second external bypass connections; and wherein the at least one first delay circuit is configured to receive an RF signal for the time delay unit, and the third external bypass connection is configured to output the RF signal for the time delay unit.

14. The time delay unit of claim 12, comprising a second external jumper coupled to the third and fourth external bypass connections; and wherein the at least one second delay circuit is configured to receive an RF signal for the time delay unit and the at least one third delay circuit is configured to output the RF signal for the time delay unit.

15. A method for making a time delay unit (TDU) for a phased array antenna comprising an antenna substrate and an array of antenna elements carried by the antenna substrate, the time delay unit comprising a plurality of delay circuits on a circuit substrate and coupled in series, each delay circuit having a respective signal delay value, the method comprising:

forming a plurality of delay circuits on the circuit substrate; and forming at least one external bypass connection on the circuit substrate, coupled to at least one of the plurality of delay circuits, and configured to be directly coupled to at least one conductive jumper external from the circuit substrate to configure an overall time delay of the time delay unit based upon the at least one conductive jumper external from the circuit substrate.

16. The method of claim 15, wherein forming the plurality of delay circuits comprise:

forming at least one first delay circuit;

forming at least one third delay circuit; and forming at least one second delay circuit between the at least one first delay circuit and the at least one third delay circuit.

17. The method of claim 16, wherein forming the at least one external bypass connection comprises:

forming a first external bypass connection coupled to an output of the at least one first delay circuit;

forming a second external bypass connection coupled to an input of the at least one second delay circuit;

forming a third external bypass connection coupled to an output of the at least one second delay circuit; and forming a fourth external bypass connection coupled to an input of the at least one third delay circuit.

18. The method of claim 17, comprising coupling a first external jumper to the first and second external bypass connections; and wherein the at least one first delay circuit is configured to receive an RF signal for the time delay unit, and the third external bypass connection is configured to output the RF signal for the time delay unit.

19. The method of claim 17, comprising coupling a second external jumper to the third and fourth external bypass connections; and wherein the at least one second delay circuit is configured to receive an RF signal for the time delay unit and the at least one third delay circuit is configured to output the RF signal for the time delay unit.

* * * * *